ized casing that contains

United States Patent
Sari et al.

(12) United States Patent
(10) Patent No.: US 6,791,477 B2
(45) Date of Patent: Sep. 14, 2004

(54) METHOD AND APPARATUS FOR IDENTIFYING WAYPOINTS AND PROVIDING KEYLESS REMOTE ENTRY IN A HANDHELD LOCATOR DEVICE

(75) Inventors: Philip D. Sari, Kelso, WA (US); Mark Kuning, Kelso, WA (US); Lester D. Hutter, Longview, WA (US); Adam Hamer, Longview, WA (US)

(73) Assignee: Waypoint West, LLC, Longview, WA (US)

(*) Notice: Subject to any disclaimer, the term of this patent is extended or adjusted under 35 U.S.C. 154(b) by 71 days.

(21) Appl. No.: 09/908,219

(22) Filed: Jul. 17, 2001

(65) Prior Publication Data

US 2003/0020638 A1 Jan. 30, 2003

(51) Int. Cl.[7] .............................................. G08G 1/123
(52) U.S. Cl. ....................... 340/995; 340/988; 340/989; 340/990; 340/825.36; 340/825.49; 342/357.01; 342/357.07; 342/357.08; 342/357.09
(58) Field of Search ................................ 340/933, 988, 340/989, 990, 991, 993, 995, 426, 539, 573.1, 573.4, 825.36, 825.49, 825.37; 342/352, 357.01, 357.06, 357.07, 357.08, 357.09; 701/201, 206, 213

(56) References Cited

U.S. PATENT DOCUMENTS

| | | | |
|---|---|---|---|
| 5,270,936 A | | 12/1993 | Fukushima et al. |
| 5,838,237 A | * | 11/1998 | Revell et al. ............. 340/573.1 |
| 6,363,324 B1 | * | 3/2002 | Hildebrant ................... 701/213 |
| 6,392,592 B1 | * | 5/2002 | Johnson et al. ........ 342/357.07 |
| 6,407,698 B1 | * | 6/2002 | Ayed ...................... 342/357.07 |
| 6,489,921 B1 | | 12/2002 | Wilkinson |
| 6,529,142 B2 | * | 3/2003 | Yeh et al. ................... 340/988 |

* cited by examiner

Primary Examiner—Daryl Pope
(74) Attorney, Agent, or Firm—Marger, Johnson & McCollom, P.C.

(57) ABSTRACT

A locator device includes a pocket-sized casing that contains a keyless remote entry circuit for remotely operating a vehicle security system. A GPS receiver circuit is located in the casing and automatically identifies a vehicle waypoint whenever the vehicle is turned off. The locator device then determines from any current location and with a single button press the direction and/or distance back to the vehicle waypoint. Many other novel applications are also performed by the locator device.

29 Claims, 10 Drawing Sheets

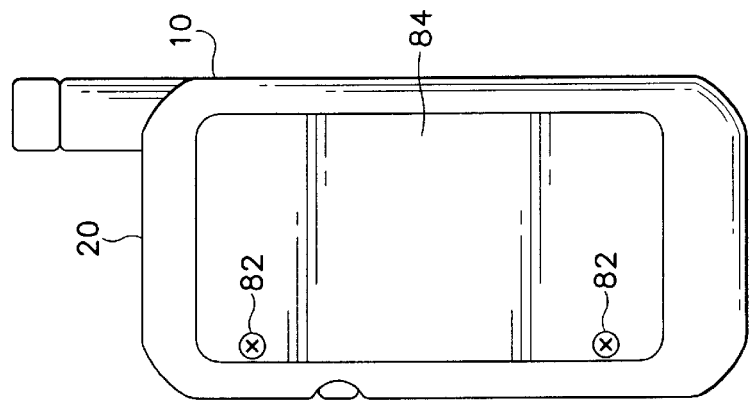
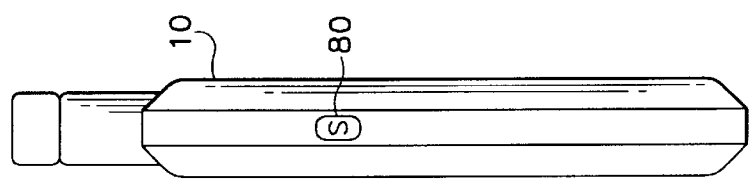
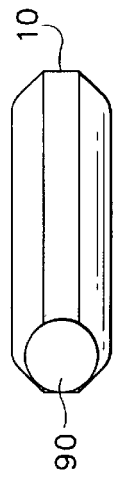
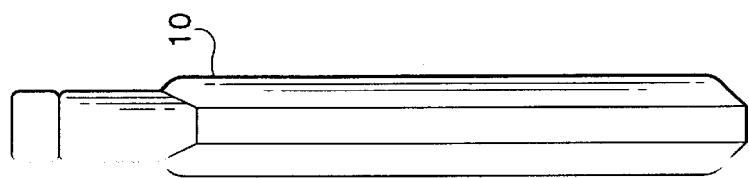
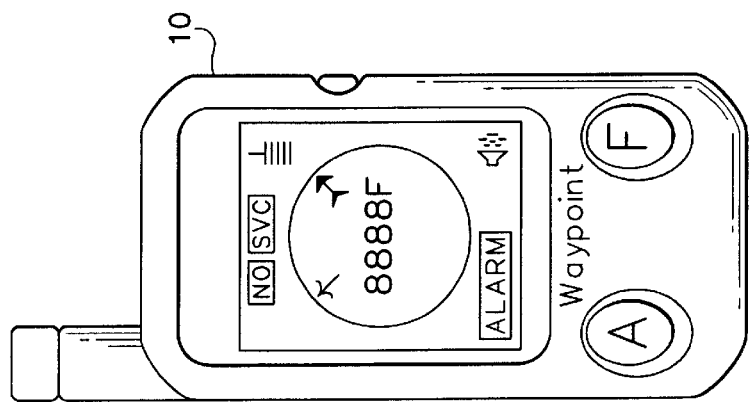

METHOD AND APPARATUS FOR IDENTIFYING WAYPOINTS AND PROVIDING KEYLESS REMOTE ENTRY IN A HANDHELD LOCATOR DEVICE

BACKGROUND OF INVENTION

Vehicle owners may park in large shopping center parking lots. The vehicle owner may forget where their vehicle is parked after hours of shopping. Travelers in unfamiliar cities also can easily forget their way back to their hotels or their parked cars. People can also get lost while hiking and have difficulty finding where their vehicle is parked at a trailhead.

Most handheld Global Positioning System (GPS) devices provide direction and distance information to a pre-determined starting point (waypoint) and display this information on a display screen. However, the GPS operator may forget to set the waypoint before heading out on a journey preventing the GPS system from identifying the original waypoint for their parked car. This is especially true then someone is frequently getting in and out of their car, for example, when driving in the city.

The GPS devices are also cumbersome and require the GPS operator to continuously carry the GPS device wherever the GPS operator is walking. Current GPS devices are also complicated to use and require the GPS operator to input numerous settings and wade through numerous menus and pushbutton operations before getting to the desired GPS information. This all prevents current GPS systems from being used effectively for city driving and in many other activities.

SUMMARY OF THE INVENTION

A locator device includes a pocket-sized casing that contains a keyless remote entry circuit for remotely operating a vehicle security system. A GPS receiver circuit is located in the casing and automatically identifies a vehicle waypoint whenever the vehicle is turned off. The locator device then determines from any current location and with a single button press the direction and/or distance back to the vehicle waypoint. Many other novel applications are also performed by the locator device.

BRIEF DESCRIPTION OF DRAWINGS

FIGS. 5A–5G are different views of the locator device shown in FIG. 1.

DETAILED DESCRIPTION OF THE INVENTION

Figure 1:
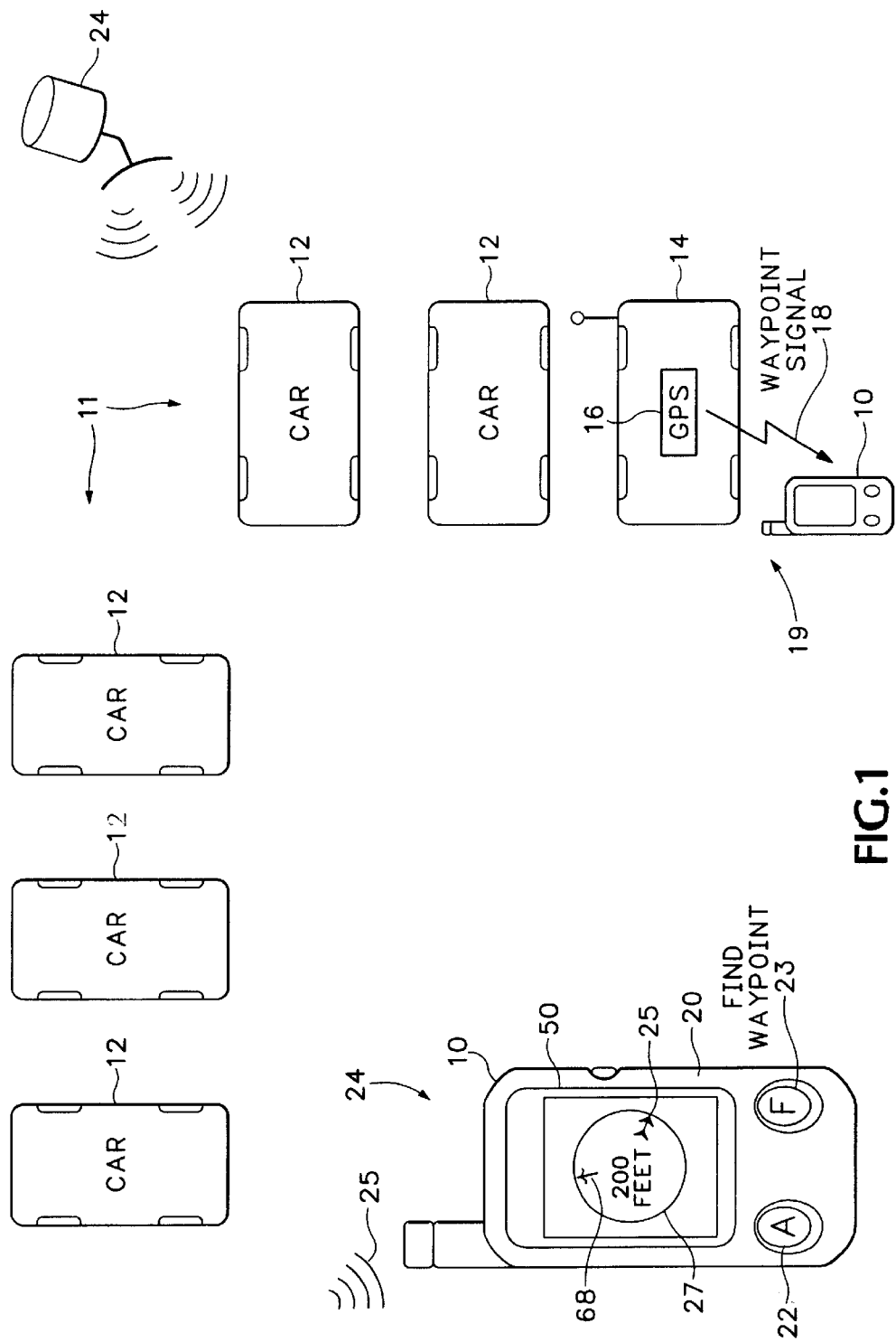
FIG. 1 is a diagram of a locator device used to determine a direction and distance back to a waypoint.
Figure 2:
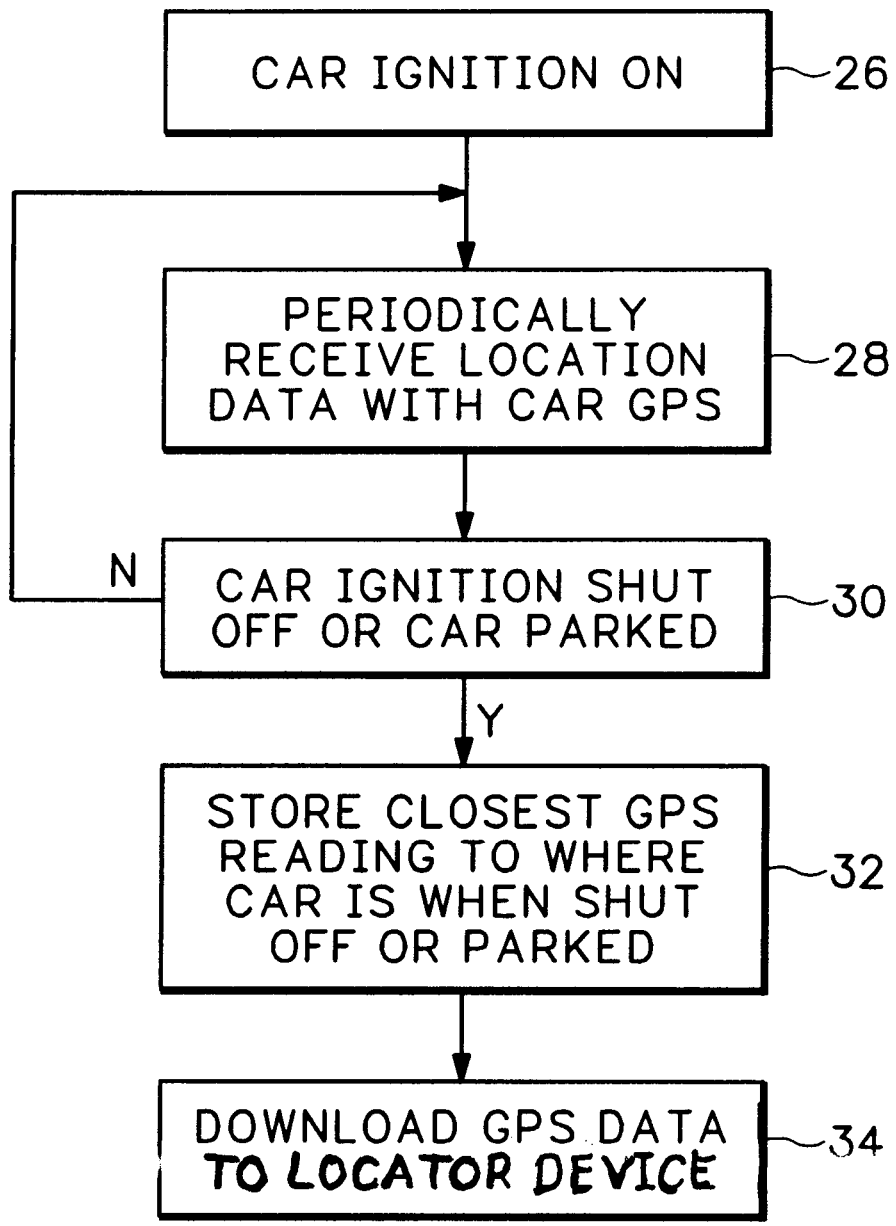
FIG. 2 is a flow diagram showing how a GPS system in a vehicle automatically downloads GPS readings to the locator device shown in FIG. 1.

FIGS. 1 and 2 show one example of how a locator device 10 is used to locate a waypoint. The general appearance of the locator device 10 is similar to currently available keyless entry remote controls used in the vehicle alarm industry. For example, the locator device 10 can be located inside a wireless remote entry 'key faub' that is about 1–1½ inches wide and around 2–2½ inches high. The locator device 10 includes a GPS circuit also located inside casing 20. A direction arrow on a Liquid Crystal Display (LCD) 50 points back to the pre-determined waypoint. The locator device 10 also includes an Radio Frequency (RF) modem 22 that provides bi-directional data transfer between other devices.

The general population is familiar and/or use key faubs to remotely activate vehicle alarms and keyless vehicle entry systems. By incorporating the locator device 10 with a key faub, an additional remote wireless GPS device does not have to be separately carried by an operator. A waypoint is automatically downloaded into the locator device 10 when a car 14 is parked. This prevents an operator from having to remember to set a waypoint when leaving a parked car. The locator device 10 can also manually determine new waypoints by pressing a single button. The operator can determine a direction and distance back to any entered waypoint with one button press. This eliminates the complexity of present GPS systems.

The RF 22 can receive waypoint information from another device, transmit internally stored waypoint data to another device and operate a vehicle alarm system, keyless entry system or other access control device.

A digital compass 68 provides a current bearing while the mobile device 10 is stationary. The compass 68 lets the locator device 10 be still while determining the correct direction and distance to the pre-stored waypoint. The display 50 also indicates other operational status information and security information relevant to keyless entry and internal battery strength.

In the example shown in FIG. 1, the locator device 10 identifies the direction back to vehicle 14 in parking lot 11. There are multiple cars 12 parked in parking lot 11. The vehicle 14 includes a GPS system 16 that receives GPS data from one or more GPS satellites 24. When the ignition in vehicle 14 is turned on in block 26 (FIG. 2), the GPS system 16 in block 28 periodically reads GPS signals from the GPS satellite 24. The GPS system 16 is continuously updated with the latest GPS data until the vehicle is shutoff or parked in block 30. The GPS system 16 stores the GPS data reading that most closely locates the position where the vehicle is parked. In one example, the last GPS reading before the vehicle is turned off is used. In another example, the GPS reading is taken when the vehicle is parked.

The GPS reading at the vehicle shutoff or parked location is stored by the vehicle GPS system 16 in block 32. The vehicle GPS system 16 then automatically downloads this GPS data at location 19 via a wire or wireless signal 18 to the locator device 10 in block 34. The locator device 10 saves the GPS data as a waypoint. The locator device 10 is then taken from the vehicle 14 and carried by the vehicle operator or passenger.

Because the position signal 18 is automatically downloaded to the locator device 10 whenever the vehicle 14 is turned off or parked, the operator of locator device 10 will not inadvertently forget to establish the waypoint before leaving vehicle 14. And because the locator device 10 is located inside the same key faub casing 20 that operates the wireless vehicle entry system, the vehicle operator will not likely forget the locator device 10 when exiting vehicle 14.

The operator moves the locator device 10 to some other location, such as position 24. To identify the location back to the car 14 (waypoint 19), the operator presses button 23. The locator device 20 receives a GPS signal 25 from one or more GPS satellites 24 and calculates a current position. The locator device 20 then calculates a direction and distance back to the waypoint 19 and displays the direction using arrow 25 and displays the distance as numeric characters 27.

It is important to note that only a single key press of key 23 is required for the operator to identify the direction and distance back to waypoint 19. This one key press operation allows easier operation then existing GPS systems.

Figure 3:
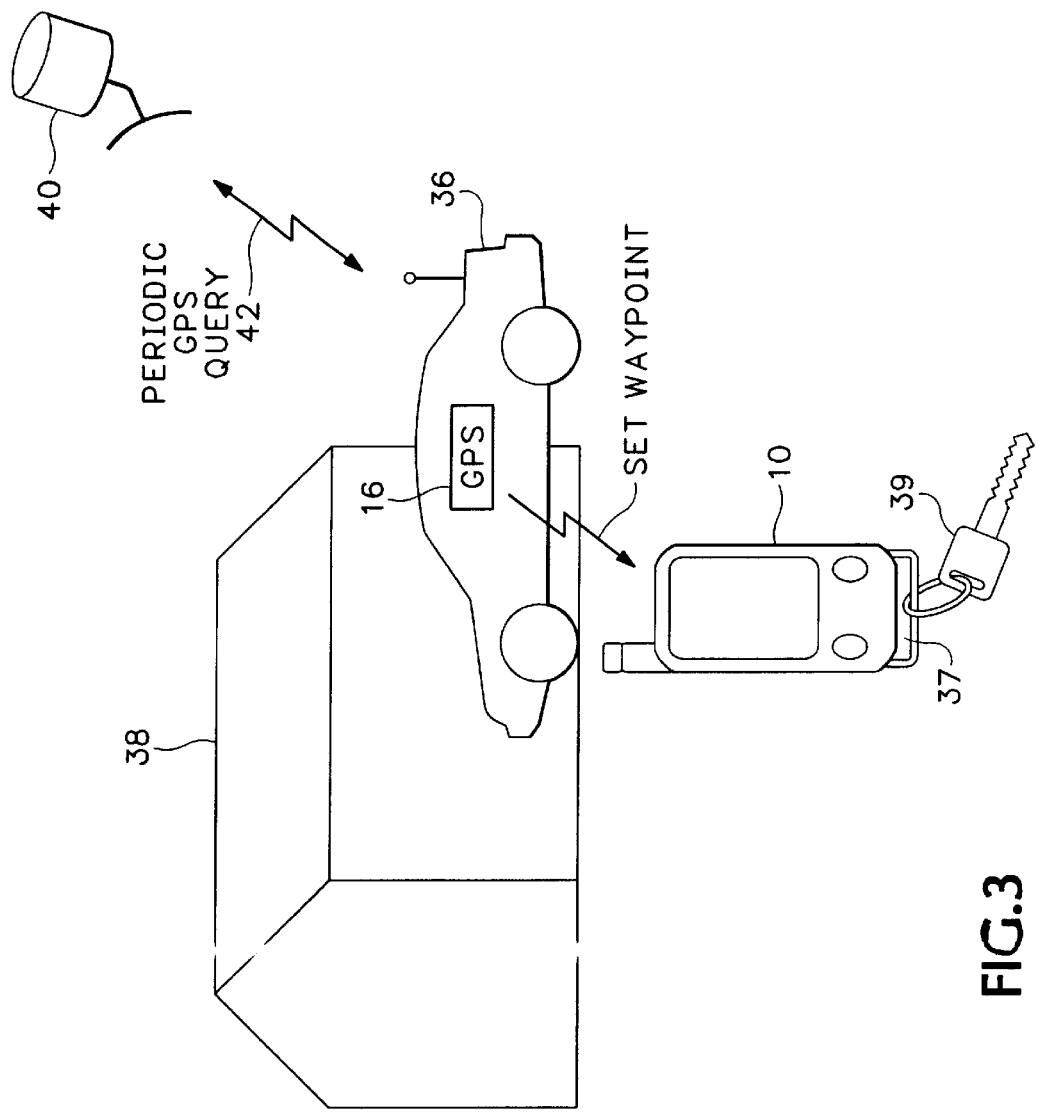
FIG. 3 is a diagram showing how the locator device is used to identify the location back to a last GPS reading taken in the vehicle GPS system.
Figure 3:
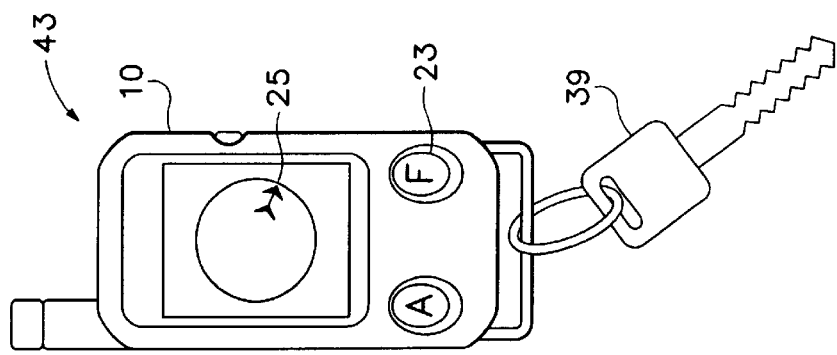

FIG. 3 shows an example of how the locator device 10 operates when a GPS signal is not detectable at the time the vehicle 36 is shutoff or parked. In some situations, the vehicle 36 containing the GPS system 16 may not be able to receive a GPS signal 42 at the time the vehicle is shutoff or parked. For example, the vehicle 36 may be driven into a parking garage 38. The last time the vehicle 36 receives GPS signal 42 is just before entering parking garage 38.

To prevent the vehicle GPS system 16 from downloading a null GPS reading to the locator device 10, the GPS system 16 periodically reads the GPS signals 42 from one of the GPS satellites 40. In one example, the GPS system 16 reads the GPS signals 42 once every second. The last "successful" GPS reading prior to the vehicle 36 being shutoff or parked is stored in the GPS system 16. This last successful reading is then automatically downloaded to the locator device 10 after the vehicle 36 is shutoff or parked.

The locator device 10 is moved to a different location 43. When the 'F' button 23 is pressed, a GPS receiver in the locator device 10 reads GPS position data from GPS satellite 40 to identify a current position. The locator device 10 then uses the current GPS position and stored GPS waypoint to identify the direction and distance back to vehicle 36. While the direction and distance may not point exactly to where the vehicle 36 was parked, the direction and distance do identify where the vehicle 36 entered the parking garage 38. This will normally be in range of the remote entry system in the locator device 10 that can then activate a horn in vehicle 36. The operator can then use the horn to audibly find vehicle 36. Of course, if the GPS signals 42 are successfully detected inside the parking garage 38, the waypoint will coincide with the parked location of vehicle 36. The locator device 10 shown in FIG. 3 also includes a slot 37 for holding a key 39. In one embodiment, the GPS data from GPS 16 is downloaded over the RF modem that also controls the vehicle security system.

Figure 4:
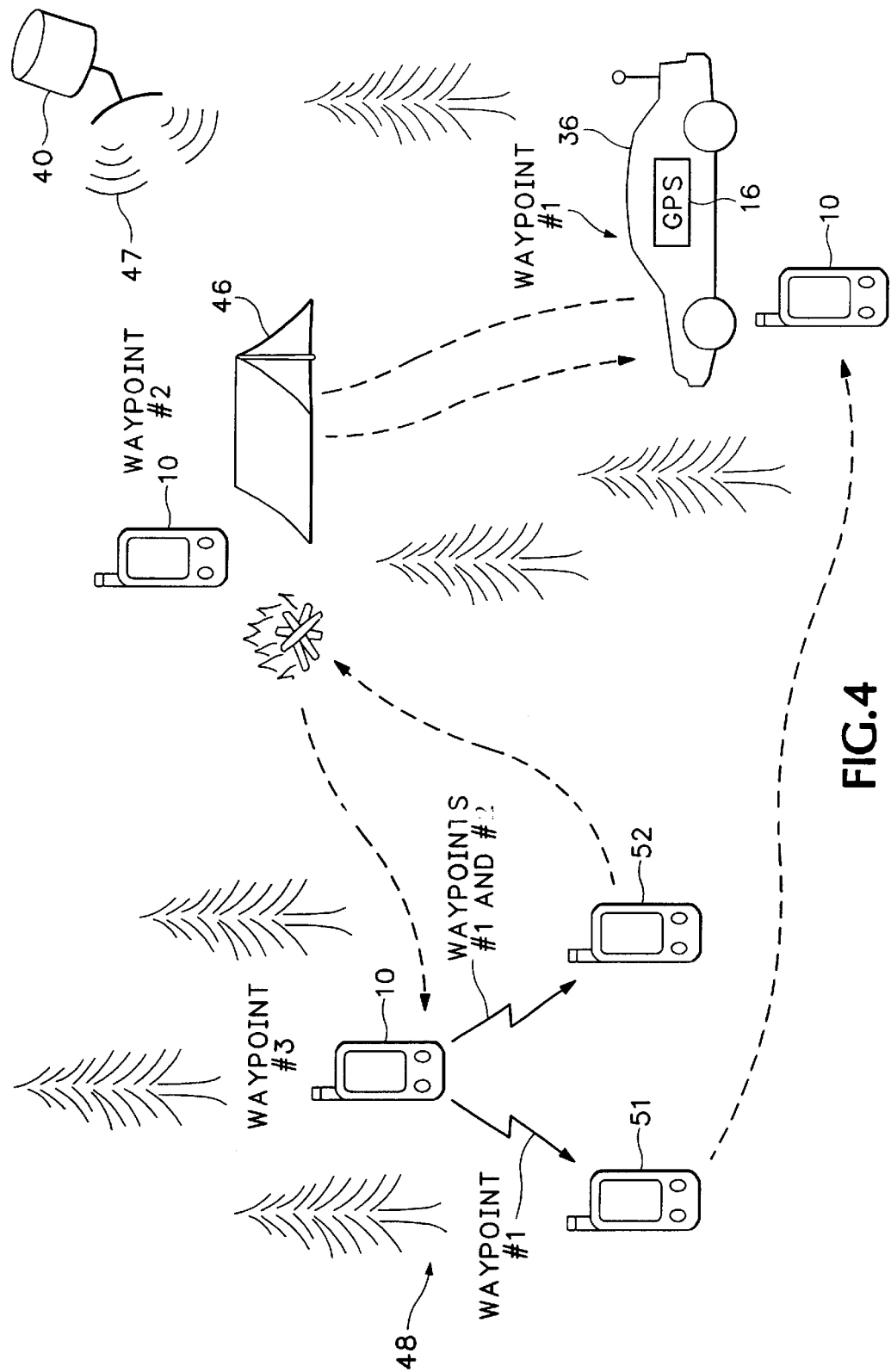
FIG. 4 is a diagram showing how multiple waypoints are used by the locator device shown in FIG. 1.

FIG. 4 shows how the locator device 10 can store multiple waypoints and download the multiple waypoints to one or more other locator devices. A vehicle 36 is parked at a waypoint #1. The GPS system 16 in vehicle 36 automatically downloads a first waypoint #1 to locator device 10. The operator of locator device 10 then hikes to a campsite 46. The operator sets a second waypoint #2 at the campsite 46. This is done by the operator manually pressing a menu option that directs the locator device 10 to read a GPS signal 47 from one of more available GPS satellites 40. A position is derived from the GPS signals 47 and stored in the locator device 10 as waypoint #2.

The operator of locator device 10 later hikes to a third location 48. Two other hikers carry locator devices 51 and 52. The operator of locator device 10 selects the menu options for reading the GPS signals 47 for location 48. The locator device 10 reads the GPS signals and calculates the position and stores it as waypoint #3.

The operator of locator device 51 wishes to travel from location 48 directly back to the vehicle at waypoint #1. The wireless modem in locator device 10 is directed to transmit the waypoint #1 information to locator device 51. The locator device 51 also reads the GPS signals 47 from the GPS satellite 40 to calculate a current position at location 48. The locator device 51 then calculates the direction and distance back to waypoint #1 and the operator of locator device 51 begins hiking back to vehicle 36.

The operator of locator device 52 wishes to hike to campsite 46 and then to the vehicle 36. The operator of locator device 52 may have never been to campsite 46 or to vehicle 36 or may have not set waypoints while at either location. The position data for waypoints #1 and #2 is downloaded from locator device 10 to locator device 52. The locator device 52 then reads the GPS signals at current location 48 and calculates the direction and distance back to campsite 46. Alternatively, locator device 52 also receives current location 48 from location device 10. When at campsite 46, the locator device 52 then calculates the direction and distance to vehicle 36 using waypoint #1 received from locator device 10.

The examples above locate a vehicle or campsite. However, it should be understood that the locator device 10 can be used to identify any location back to any waypoint. It is also possible for the locator device 10 to manually read the GPS data at the location of vehicle 36 directly from the GPS satellite 40. This may be necessary if the vehicle GPS system 16 is non-operational or does not exist.

Figure 5A:
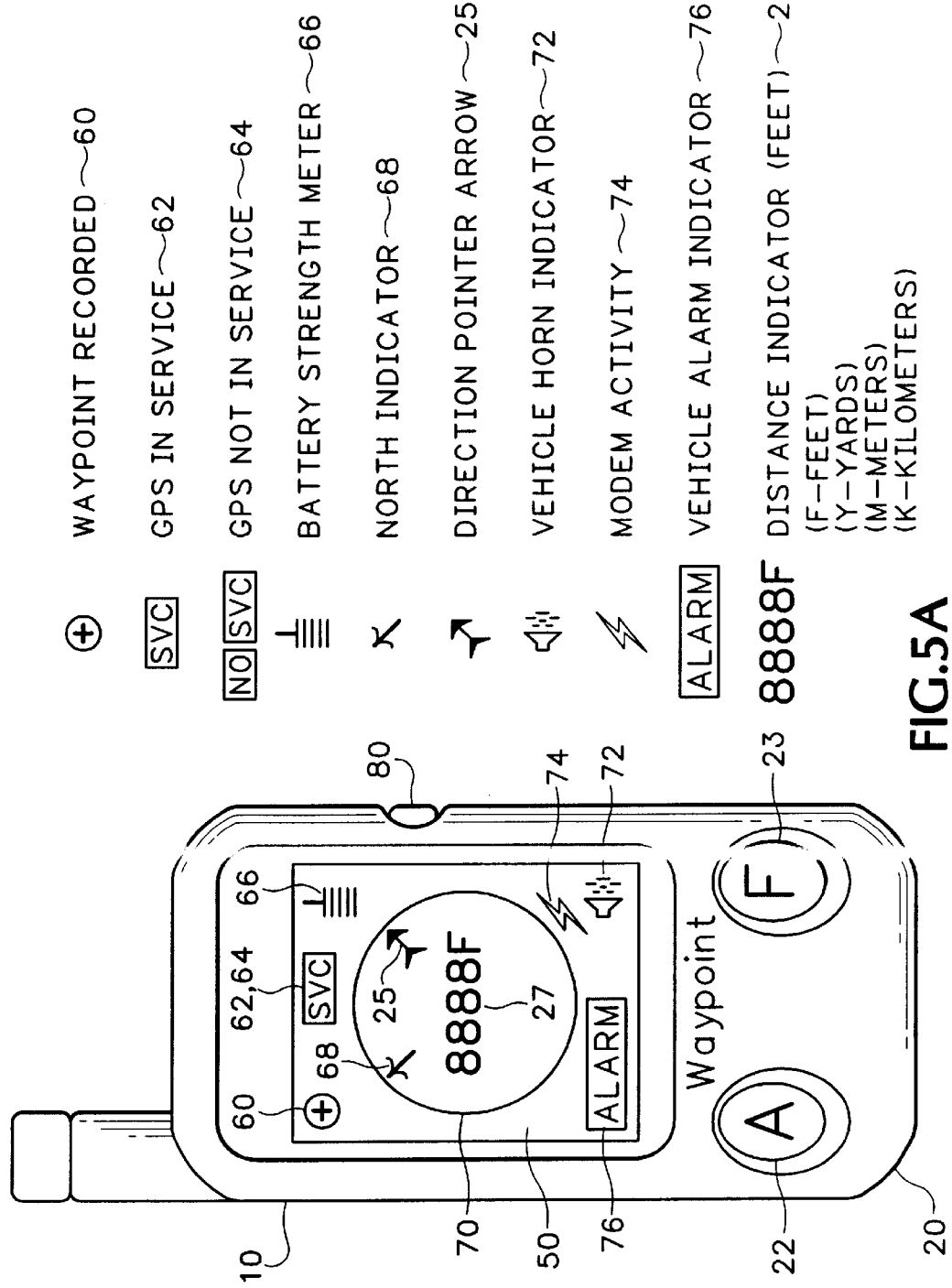

FIG. 5A explains in further detail the functions performed by the locator device 10. The 'A' button 22 is used to activate or disable a vehicle alarm or lock or unlock a vehicle keyless entry system. The 'A' Button also provides sub-functions for a user set up menu described below. The 'F' button 23 is used to activate the 'Find waypoint' function that activates the internal GPS receiver to take a GPS reading, determine a current position, and calculate a direction and distance to a selected waypoint. The 'F' button also selects additional sub-functions in the user set up menu.

The screen 50 in one embodiment is a color, Liquid Crystal Display (LCD) panel assembly with backlight and piezo enunciator. A waypoint recorded icon 60 indicates a waypoint has been recorded. A GPS In Service icon 62 is displayed when a GPS signal can be read by the locator device 10 and a GPS Not In Service icon 64 is displayed when the GPS signal can not currently be read by the locator device 10. A Battery Strength Meter icon 66 identifies the amount of charge for a battery in the locator device 10.

A North Indicator icon 68 is displayed by an internal electronic compass to identify the direction of magnetic north. A Direction Pointer Arrow icon 25 identifies the direction from a current GPS location to a selected waypoint and displays a compass rose 70 with multiple point positions.

A Vehicle Horn Indicator icon 72 indicates that the vehicle has responded to a request by the user (button 'A') to turn off the vehicle alarm and honk the horn. A Modem Activity icon 74 indicates when an internal modem is transmitting of receiving data with another device. A Vehicle Alarm Indicator icon 76 is displayed when a vehicle alarm has been set by the keyless entry circuitry in the vehicle. An alphanumeric display 27 indicates a distance from a derived current location to a selected waypoint. The alphanumeric display 27 can be configured during a setup mode to display distance in increments of feet, yards, meters or kilometers. The alphanumeric display 27 is also used in a setup mode to show menu and submenu names.

FIG. 5B is another front view of the locator device 10 and FIG. 5C is a left side view of the locator device 10. FIG. 5D is a right side view showing a 'S' button 80 used to activate the GPS receiver to take a GPS reading and store derived positional data as a waypoint. FIG. 5E is a back view of locator device 10 that shows retaining screws 82 used to attach a rear door 84 to the case 20. The rear door 84 includes tabs (not shown) on the end opposite to the screws 82 that fit into recessed areas in the case 20. FIG. 5F is a bottom view that shows a recessed lanyard 86 with a stainless steel wrist pin 88 for attaching to a key ring. FIG. 5G is a top view showing a top end of an antenna 90.

Figure 6C:
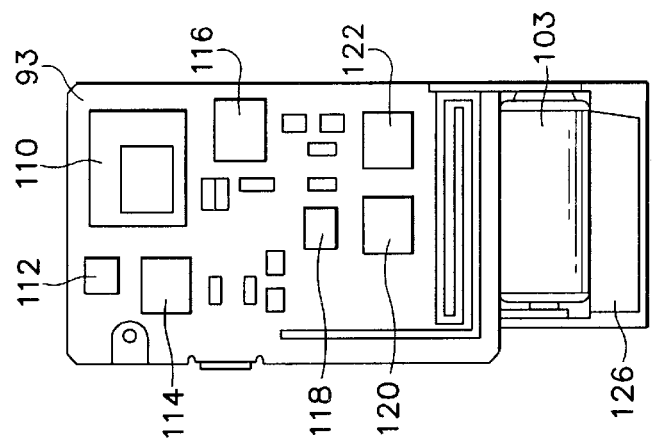
FIGS. 6A–6C are different views of the circuitry inside the locator device.
Figure 6B:
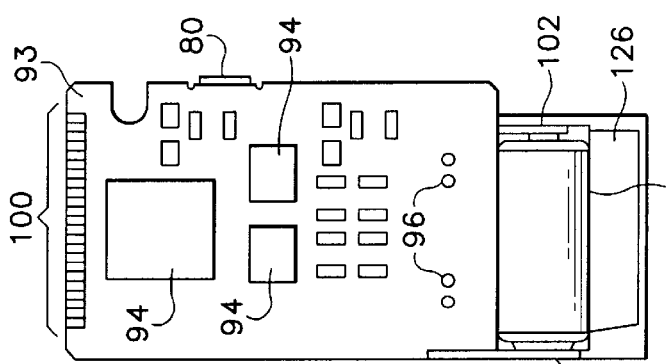
Figure 6A:
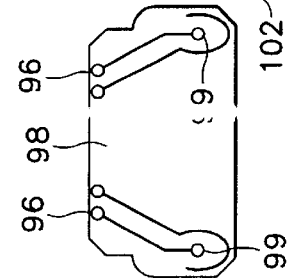
Figure 6A:
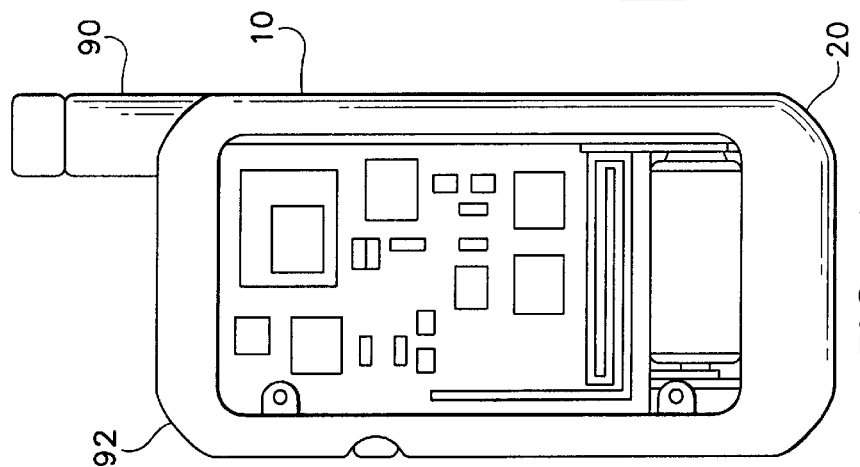

FIG. 6A is a back view of the locator device 10 with the rear access door removed. The case 20 includes front and back pieces of plastic glued around the edges to maintain a water resilient seal. The RF antenna 90 is an integrated GPS active patch antenna with a molded rubber coating finish. Silicon rubber O-ring seals 92 are used between the rear access door 84 (FIG. 5E) and casing 20 and between the LCD display screen 50 (FIG. 5A) and the front piece of casing 20.

FIG. 6B is a front view of a main circuit board 93. The multi-layered glass epoxy circuit board 93 connects all the various surface mount components and provides interlayer shielding. A Global Positioning System (GPS) receiver 94 and an EEPROM are mounted on the front side of the main circuit board 93 for running the operating system software. Contacts 96 are used for connecting a front panel circuit board 98 to the main circuit board 93. The front panel circuit board 98 is a double-sided glass epoxy circuit board and detects the push buttons 22 and 23 (FIG. 5A) through resistance type tactile contacts 99. Battery contacts 102 connect to an internal battery 103. The battery 103 is a rechargeable lithium-ion battery. An inductive pickup and battery charging module 126 recharges battery 103. The 'S' button 80 is a mechanical tactile switch assembly. Circuit board contacts 100 provide connection to a Flex Circuit that is coupled to the LCD display 50 shown in FIG. 5A.

FIG. 6C is a rear view of the main circuit board 93. A display driver 110 controls the display 50. A non-volatile memory IC 112 provides temporary storage of positioning data. An electronic compass processor 114 provides electronic compass readings. A Central Processing Unit (CPU) 116 processes GPS and electronic compass information to generate direction and distance information. The CPU 116 also processes data received from another RF modem in a vehicle that provides keyless remote entry status.

A Voltage Controlled Oscillator (VCO) 118 generates radio frequencies in the 300 MHz range. A transceiver 120 generates encoded transmit data and decodes received data. A Radio Frequency (RF) modem IC 122 transmits encrypted control data to a vehicle for processing as vehicle keyless entry and alarm functions. The RF modem 122 also receives vehicle status data and waypoint positional data from outside sources for forwarding to the CPU 116.

Figure 7A:
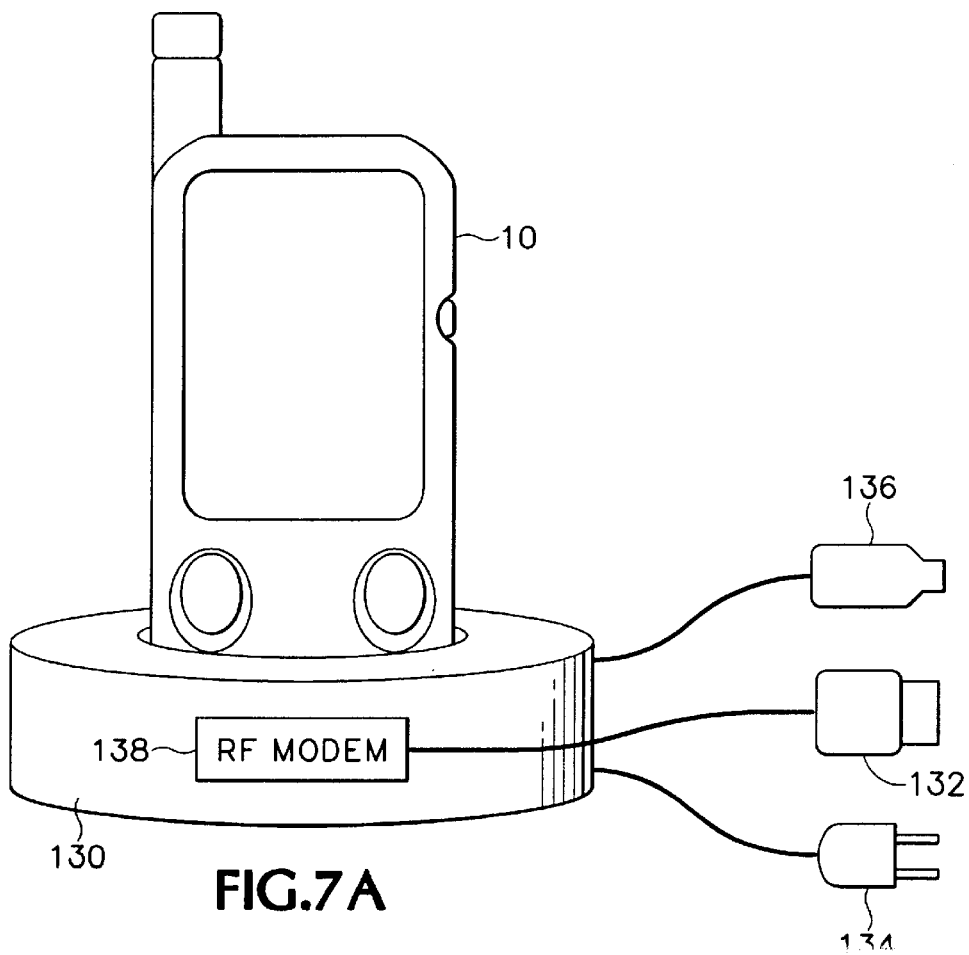
FIGS. 7A–7B are diagrams showing a charging system used for recharging a battery in the locator device.
Figure 7B:
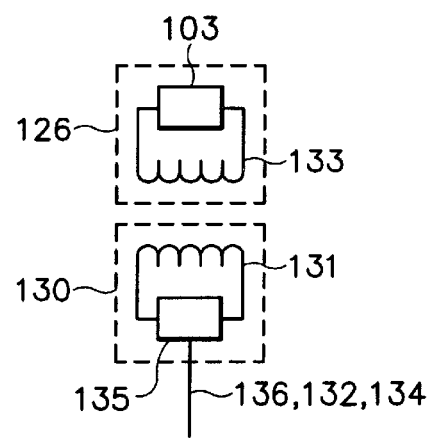

FIGS. 7A and 7B show a device charger 130 that operates by inductively coupling an internal transformer windings 131 to a mating inductive winding 133 in the battery-charging module 126 of locator device 10. The device charger 130 can also include an RF modem 138 that communicates with the RF modem 122 in locator device 10 (FIG. 6C).

In one embodiment, a Universal Serial Bus (USB) connector 132 is coupled to the RF modem 138 and provides power to a transformer circuit 135 for supplying power to the internal transformer windings 131. The USB connector 132 also exchanges position and other data through the RF modem 138 to the locator device 10. The USB connector 132 is coupled to either the GPS system 16 (FIG. 1) in vehicle 14 or to some other GPS or computer system. In another embodiment, an Alternating Current (AC) plug 134 provides 120 volt AC power to the transformer 135 in charger 130. In yet another embodiment, a 12 volt vehicle adapter 136 connects power from a vehicle car battery and/or car alternator to the device charger 130.

Figure 8:
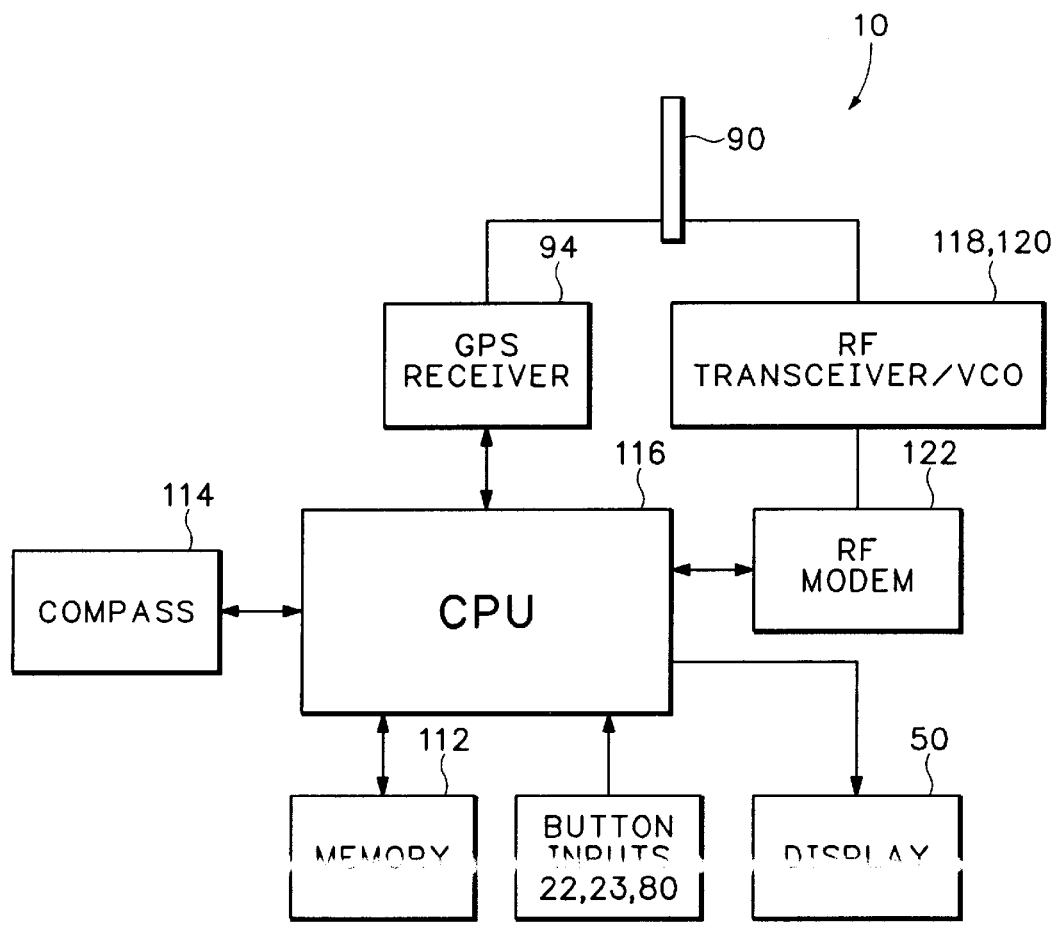
FIG. 8 is a block diagram showing the functional elements inside the locator device.

FIG. 8 is a logical block diagram showing how the different functional blocks in the locator device 10 operate. The GPS receiver 94 and the RF transceiver 120 are coupled to antenna 90. The CPU 116 receives data from the compass 114, RF modem 120 and GPS receiver 94. The memory 112 is used to store multiple waypoints and whatever information is required to operate the mobile unit 10. The CPU 116 receives operator inputs 22, 23 and 80 and displays outputs on display screen 50.

The VCO 118 keeps the RF modem 122 locked onto the correct frequency and is programmable for different frequencies. The RF modem 122 transmits RF data sent by the CPU 116 or receives RF data received from other wireless equipped control systems either in a vehicle of in another locator or GPS device. The RF modem 122 transmits and receives latitude and longitude waypoint information and keyless vehicle entry commands.

Figure 9:
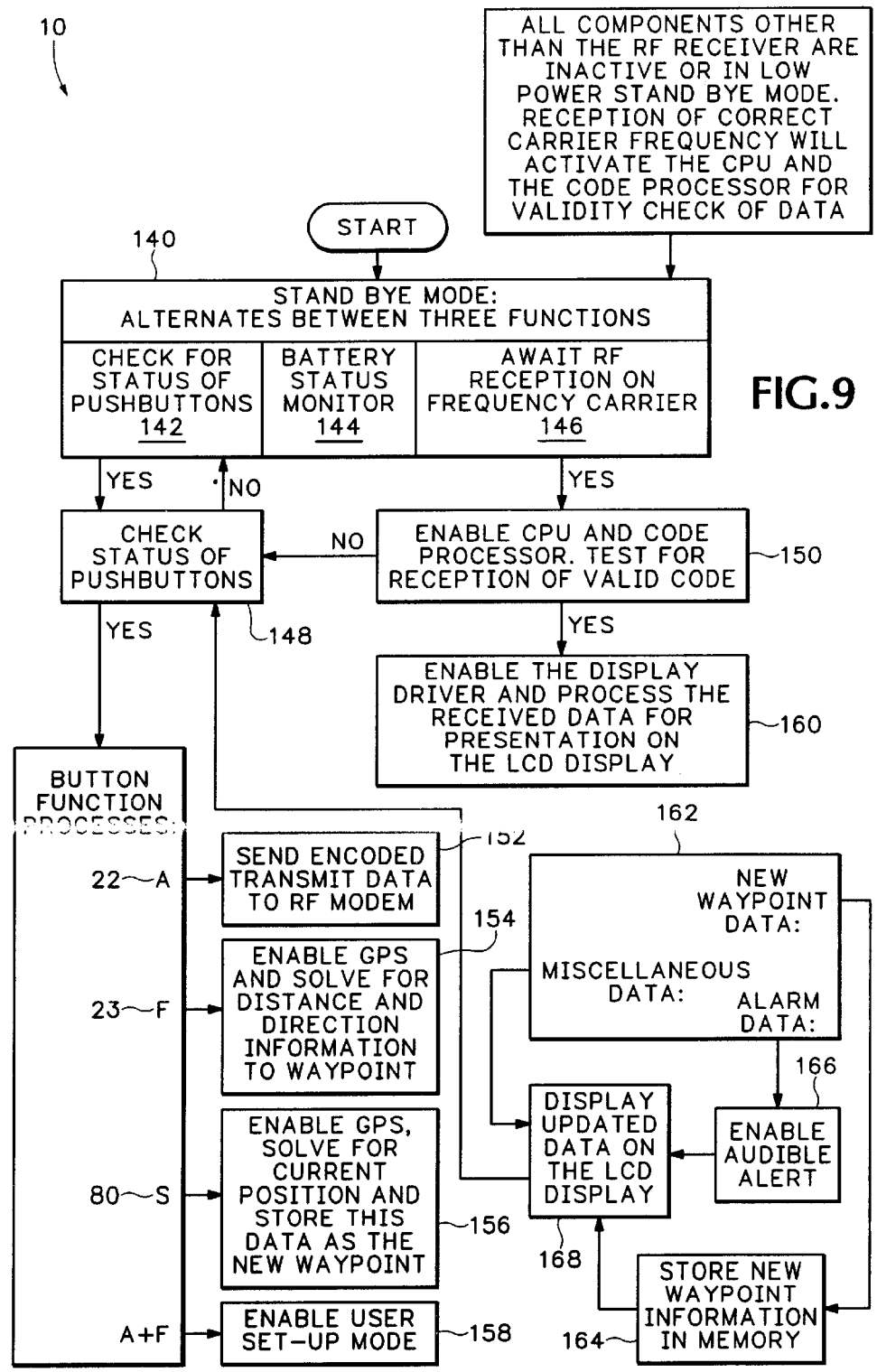
FIG. 9 is a flow diagram showing how the locator device operates.

FIG. 9 is a flow diagram showing how the CPU 116 and other elements in locator device 10 operate. The CPU 116 in block 140 operates in a standby mode and alternates between three different functions. In block 142 the status of the pushbuttons 22, 23 and 80 are constantly checked. In block 144 the status of battery 103 is constantly monitored. In block 146 the RF modem 122 waits for a RF reception on a predetermined carrier frequency. In one embodiment, button activations and alarm indications initiate a piezo crystal buzzer located behind the LCD display 50 for user verification of commands. The same type used in watches etc.

Detecting a depression of the 'S' button 80 in block 156 activates the GPS receiver 94 and automatically sets a 'Waypoint' based on a received GPS longitude and latitude reading. Detecting depression of the 'A' button 22 in block 152 sends encoded transmit data to the RF modem 122. The transmit data can be position data, keyless car lock or unlock data, or security alarm activation/deactivation data. Detecting selection of the 'F' button 23 in block 154 enables the GPS receiver 94 to read a GPS longitude and latitude reading at a current position and then calculate a distance and direction to a saved waypoint.

A locator device operator is only required to press the 'F' button 23 once to determine a direction and distance to a waypoint. A single depression of the 'F' button 23 automatically activates the GPS receiver 94, calculates a current position from the GPS signals received by the GPS receiver 94, derives a distance from the calculated current position to a last programmed waypoint stored in memory, and outputs the distance and direction on the display 50.

The locator device 10 operates as a two-way vehicular keyless entry controller in block 150 when an RF signal is received in block 146 or when the 'A' button 23 is pressed in block 152. A single push of the 'A' button 22 in block 152 initiates an encoded transmission via the RF modem 122 for locking or unlocking a vehicle. The vehicle transmits back RF signals in block 150 that verify the transmitted commands and alarm status. In block 160, the RF data received by the RF modem 122 may cause the CPU 116 to output icons from display 50.

Block 162 identifies some of the data that can be transmitted to the locator device 10 including new waypoint data, alarm data, or miscellaneous data. When new waypoint data is received, block 164 stores the information in memory 112 in the locator device 10 and might display the data on the display 50 in block 168. If alarm data is received in block 166, an audible alert is activated in the locator device 10. Any other miscellaneous data may also be received or displayed on display 50 in block 168.

Setup Menu

A setup menu is reached in block 158 by pressing, and holding down both the 'A' and 'F' buttons simultaneously until 'SETUP' shows on the display screen 50. The 'A' and 'F' buttons are released and any one of the actions below can be selected. Pressing the 'F' button 23 steps forward to a next menu option. In one example, five setup menus are displayed in the following order on the alphanumeric display 50. A 'STORE' menu is used to store a current waypoint to memory 112. The 'S' button is used to select any one of multiple memory locations. Selecting the 'A' button 22 while in the setup mode accepts and exits the setup mode. Using the 'F' button 23 while in the setup mode steps to a next menu selection.

A menu option 'TX WPT' is used to transmit a current waypoint stored in the locator device 10 to another device. Using the 'A' button activates the RF modem 122 to transmit the TX WPT and then exits the setup mode.

A menu option 'TXMEM' is used to transmit one of multiple waypoints stored in memory to another device. Pressing the 'S' button 80 scrolls through the memory locations for the different waypoints. Pressing the 'A' button 22 transmits the selected waypoint and then exits the setup mode.

A menu option 'RANGE' is used to display different distance format and pressing the 'S' button steps through the following distance formats.

| FEET | Up to 9,999 Feet-Display shows 'F' |
| YARDS | Up to 9,999 Yards-Display shows 'Y' |
| METER | Up to 9,999 Meters-Display shows 'M' |
| KILOMETERS | Up to 9,999 Kilometers-Display shows 'K' |

Pressing the 'A' button accepts a selected format and exits the setup mode. Pressing the 'F' button is used to step to a next menu option. An 'EXIT' menu option exists the setup mode when the 'A' button is pressed.

The system described above can use dedicated processor systems, micro controllers, programmable logic devices, or microprocessors that perform some or all of the mail notification operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

What is claimed is:

1. A key faub, comprising:
    a locator circuit configured to receive a waypoint after a triggering event and configured to determine directional information from a current location to the identified waypoint, wherein the waypoint is calculated prior to the triggering event; and
    a display for showing the directional information.

2. A key faub according to claim 1 including a remote keyless vehicle entry circuit for remotely locking and unlocking a vehicle.

3. A key faub according to claim 2 including a water resistant enclosed casing that contains all of the locator circuitry and the vehicle entry circuitry and includes a slot for holding keys.

4. A key faub according to claim 3 wherein the casing has a height of approximately 2–2½ inches and a width of about 1–1½ inches.

5. A key faub according to claim 1 wherein the locator circuit includes a Global Positioning System (GPS) receiver for receiving GPS location data from GPS satellites and a wireless modem that receives GPS location data from other GPS receivers.

6. A key faub according to claim 5 wherein the wireless modem automatically receives a vehicle location taken from another GPS system in the vehicle.

7. A key faub according to claim 6 wherein the locator circuit automatically stores the vehicle location as the waypoint.

8. A key faub according to claim 1 including an electronic compass circuit for showing the directional information in relation to compass directions output by the electronic compass circuit.

9. A key faub according to claim 1 wherein the display shows both a direction from the current position to the waypoint and a distance from the current position to the waypoint.

10. A key faub according to claim 1 including a first button that when depressed initiates the locator circuit to acquire satellite GPS location data, derive the current location from the GPS location data, calculate a heading and distance to the waypoint, and output the heading and distance on the display.

11. A key faub according to claim 10 including a second button that when depressed initiates the locator circuit to turn on, acquire available GPS satellite information, derive the current position and store the current position in a memory as the waypoint.

12. A key faub according to claim 1 including a memory for storing multiple waypoints, the locator circuit identifying a direction and distance from the current position to any one of the stored multiple waypoints.

13. A key faub according to claim 1 including a transceiver for both transferring vehicle security commands with a vehicle securing system and for transferring GPS data with other locator circuits.

14. A key faub according to claim 1 including an internal battery that uses an inductive charger for recharging.

15. A method for finding a reference location, comprising:
    identifying when a triggering event occurs;
    downloading GPS location data to be used as the reference location to a handheld locator device after the triggering event occurs, wherein the GPS vehicle location data is determined prior to the triggering event;

moving the locator device to a current location away from the reference location;

using a GPS circuit in the locator device to receive current GPS location data identifying the current location; and identifying a target direction from the current location to the reference location using the GPS location data and the current GPS location data.

16. A method according to claim 15 including automatically downloading the GPS location data to the handheld locator device without any user intervention.

17. A method according to claim 15 including integrating the locator device in a pocket sized key faub that also contains a screen for displaying the target direction and an RF modem for remotely controlling a vehicle security system.

18. A method according to claim 17 including displaying compass references in relation to the target direction displayed on the screen.

19. A method according to claim 18 including displaying a distance from the current location to the reference location on the screen.

20. A method according to claim 18 including providing menu options for: storing multiple waypoints; selecting one of the multiple waypoints for using as the reference location; and transmitting waypoints over an RF modem.

21. A method according to claim 15 including automatically storing the last successful GPS location reading in a vehicle GPS system before the triggering event and automatically downloading the last successful GPS location reading to the locator device after the triggering event.

22. A method according to claim 15 including pressing a single button on the locator device to acquire GPS location data, derive the current location from the GPS location data, calculate a heading and distance to the reference location, and display the heading and distance.

23. A method according to claim 22 including pressing a single button on the locator device to turn on the locator circuitry, acquire GPS satellite data, derive the reference location, and store the reference location.

24. A method according to claim 15 including transmitting the reference location from the handheld locator device to another handheld locator device.

25. A locator device, comprising:

a pocket-sized casing;

a keyless remote entry circuit located in the casing;

a GPS receiver circuit located in the casing configured to identify both a first location and a current location;

a wireless modem in the casing configured to automatically download a second location from a GPS system affixed to a vehicle whenever the vehicle is parked or shutoff; and a processor configured to derive a direction and distance from the current location to a waypoint selected from the group consisting of the first location and the second location.

26. A locator device according to claim 25 including a first button on the casing that initiates downloading a first set of GPS data from a GPS satellite and downloads the GPS data into a memory as the first location.

27. A locator device according to claim 26 including a second button that initiates downloading a second set of GPS data, determines the current location from the second set of GPS data, displays an arrow on the display pointing from the current location to the waypoint, and displays a distance from the current location to the waypoint.

28. A locator device according to claim 27 including a transceiver for sending the waypoint directly to other locator devices.

29. A locator device according to claim 28 including a third button on the remote entry circuit that initiates the wireless modem coupled to the keyless remote entry circuit to wirelessly lock or unlock a vehicle.

* * * * *

UNITED STATES PATENT AND TRADEMARK OFFICE
CERTIFICATE OF CORRECTION

| | |
|---|---|
| PATENT NO. | : 6,791,477 B2 |
| APPLICATION NO. | : 09/908219 |
| DATED | : September 14, 2004 |
| INVENTOR(S) | : Philip D. Sari et al. |

It is certified that error appears in the above-identified patent and that said Letters Patent is hereby corrected as shown below:

At column 9, line 1, delete the word "vehicle".

Signed and Sealed this

Fifth Day of August, 2008

JON W. DUDAS
*Director of the United States Patent and Trademark Office*